(12) United States Patent
Koseki

(10) Patent No.: US 10,853,954 B1
(45) Date of Patent: Dec. 1, 2020

(54) IMAGE PROCESSING APPARATUS, IMAGE PROCESSING METHOD AND STORAGE MEDIA

(71) Applicant: MORPHO, INC., Tokyo (JP)

(72) Inventor: Taiga Koseki, Tokyo (JP)

(73) Assignee: MORPHO, INC., Tokyo (JP)

( * ) Notice: Subject to any disclaimer, the term of this patent is extended or adjusted under 35 U.S.C. 154(b) by 0 days.

(21) Appl. No.: 15/931,743

(22) Filed: May 14, 2020

(30) Foreign Application Priority Data

May 16, 2019 (JP) .................................. 2019-093086

(51) Int. Cl.
*G06T 7/32* (2017.01)
*G06T 5/50* (2006.01)
*G06T 5/00* (2006.01)

(52) U.S. Cl.
CPC ................ *G06T 7/32* (2017.01); *G06T 5/002* (2013.01); *G06T 5/003* (2013.01); *G06T 5/50* (2013.01)

(58) Field of Classification Search
CPC .............. G06F 3/04842; G06F 3/0481; G06F 3/04845; G06K 9/6211; G06K 9/32; G06T 5/50; G06T 5/002; G06T 5/003; G06T 2207/20221; G06T 11/60; G06T 2207/20216; G06T 7/33; G06T 7/32; H04N 5/23277
See application file for complete search history.

(56) References Cited

U.S. PATENT DOCUMENTS

| | | | | |
|---|---|---|---|---|
| 9,167,135 | B2* | 10/2015 | Furukawa | H04N 5/145 |
| 2010/0322485 | A1* | 12/2010 | Riddiford | G06F 21/36 |
| | | | | 382/115 |
| 2012/0086836 | A1* | 4/2012 | Li | H04N 5/23254 |
| | | | | 348/241 |
| 2012/0120284 | A1* | 5/2012 | Li | H04N 5/23277 |
| | | | | 348/241 |

(Continued)

FOREIGN PATENT DOCUMENTS

| | | |
|---|---|---|
| JP | 2000-244851 A | 9/2000 |
| JP | 2005-129996 A | 5/2005 |

(Continued)

OTHER PUBLICATIONS

Decision to Grant a Patent for corresponding JP 2019-093086, dated Jul. 5, 2019.

*Primary Examiner* — Jingge Wu
(74) *Attorney, Agent, or Firm* — Sughrue Mion, PLLC

(57) ABSTRACT

The image processing apparatus includes: an input unit configured to receive input of a plurality of images; an alignment unit configured to select each of the plurality of images one by one as a base image, and aligns the base image and each of comparison images; a selection unit configured to select the comparison image to be combined with the base image from among the comparison images aligned with the base image for each of the base images, calculate a common region in which images included in the combination can be commonly drawn, and select the combination in which the ratio of the common region to the base image satisfies a predetermined condition; a determination unit configured to determine the combination that maximizes the number of comparison images from the selected combination; and an output unit configured to output an image group corresponding to the determined combination.

12 Claims, 13 Drawing Sheets

(56) References Cited

U.S. PATENT DOCUMENTS

| | | | |
|---|---|---|---|
| 2013/0314557 A1* | 11/2013 | Furukawa | H04N 5/21 |
| | | | 348/208.1 |
| 2016/0119388 A1* | 4/2016 | Sitrick | G06T 11/60 |
| | | | 715/753 |
| 2016/0358360 A1* | 12/2016 | Wildey | G06T 3/40 |
| 2018/0047176 A1* | 2/2018 | Toyoda | G06T 3/4053 |
| 2019/0170502 A1* | 6/2019 | Tamaru | G03B 15/00 |
| 2020/0098119 A1* | 3/2020 | Okazawa | G06T 5/50 |
| 2020/0120271 A1* | 4/2020 | Furukawa | H04N 5/349 |
| 2020/0120272 A1* | 4/2020 | Furukawa | G06T 3/40 |

FOREIGN PATENT DOCUMENTS

| | | |
|---|---|---|
| JP | 2009-164857 A | 7/2009 |
| JP | 2016-127343 A | 7/2016 |

* cited by examiner

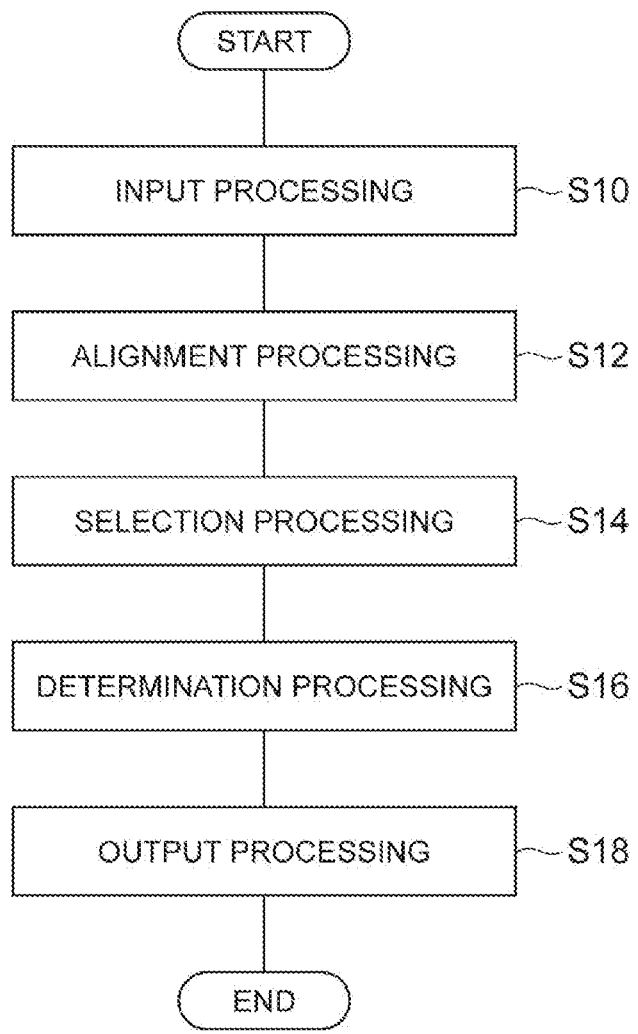

IMAGE PROCESSING APPARATUS, IMAGE PROCESSING METHOD AND STORAGE MEDIA

CROSS-REFERENCE TO RELATED APPLICATION

This application is based on Japanese Patent Application No. 2019-093086 filed with Japan Patent Office on May 16, 2019, the entire contents of which are hereby incorporated by reference.

TECHNICAL FIELD

The present disclosure relates to an image processing apparatus, an image processing method, and a storage media.

BACKGROUND

Japanese Patent Application Laid-Open Publication No. 2000-244851 discloses an image processing apparatus for compositing a plurality of images to generate a single high-resolution image. The image processing apparatus selects an image having the maximum edge intensity from among a plurality of images as one base image. Then, the image processing apparatus aligns and composites other images with the base image. The base image having the maximum edge intensity is assumed to be an image captured with the clearest focus among a plurality of stored images. Therefore, the image other than the base image has a function of adding value to the image quality of the base image. This ensures, at least, an improvement in image quality over the image quality in a case where the base image is used alone.

SUMMARY OF INVENTION

According to the imaging apparatus disclosed in Japanese Patent Application Laid-Open Publication No. 2000-244851, however, there are cases where the image quality is not improved as compared with the image quality in the case where the base image is used alone. For example, there are cases where the base image and other images are shooting scenes different from each other, and there are cases where the same subject is not captured. In such cases, the compositing process itself of the base image and the other images cannot be appropriately performed. As described above, in a method of simply selecting an image of good image quality from a plurality of images as a base image, image quality improvement by image composite may not be expected.

An object of the present disclosure is to provide an image processing apparatus, image processing method, and a storage media that are appropriately able to select a base image and an image to be processed together with the base image from a plurality of images.

According to one aspect of the present disclosure, an image processing apparatus is provided. The image processing apparatus includes an input unit, an alignment unit, a selection unit, a determination unit and an output unit. The input unit is configured to receive input of a plurality of images. The alignment unit configured to select each of the plurality of images one by one as a base image, and aligns the base image and each of comparison images, which are images excluding the base image among the plurality of images, for each of the base images based on the image features. The selection unit configured to select the comparison image to be combined with the base image from among the comparison images aligned with the base image for each of the base images, calculate a common region in which images included in the combination can be commonly drawn, and select the combination in which the ratio of the common region to the base image is equal to or greater than a predetermined threshold. The determination unit configured to determine the combination that maximizes the number of comparison images from the selected combination. The output unit configured to output an image group corresponding to the determined combination and information indicating the base image corresponding to the image group.

According to the image processing apparatus, each of a plurality of input images is selected as a base image one by one by the alignment unit, and the alignment with the each of comparison images are performed for each base image. A combination of the base image and the comparison image in which the ratio of the common region to the base image is equal to or greater than a predetermined threshold by the selection unit. A combination that maximizes the number of the corresponding comparison images from among the selected combinations is determined by the determination unit. An image group corresponding to the combination and information indicating a base image corresponding to the image group is output by the output unit. In this manner, all of the plurality of input images are set as the base image, and a combination in which the ratio of the common region to the base image satisfies a predetermined condition is selected. In a case of improving an image quality or a recognition accuracy by using a plurality of images, the effect decreases as the common region becomes smaller. By selecting a combination in which the ratio between the common area and the base image is equal to or greater than a predetermined threshold, the image processing apparatus can avoid a decrease in the effect obtained by processing a plurality of images. Further, in the case of improving the image quality or the recognition accuracy by using a plurality of images, the effect increases as the number of comparison images increases. The image processing apparatus can maximize the effect of the subsequent image processing by determining a combination in which the number of comparison images is the maximum among the determined combinations. Therefore, the image processing apparatus can appropriately select a base image for processing a plurality of images and an image to be processed together with the base image from a plurality of images.

BRIEF DESCRIPTION OF THE DRAWINGS

FIG. 6 is a flowchart illustrating an image processing method according to the first embodiment.

DESCRIPTION OF EMBODIMENTS

Figure 1:
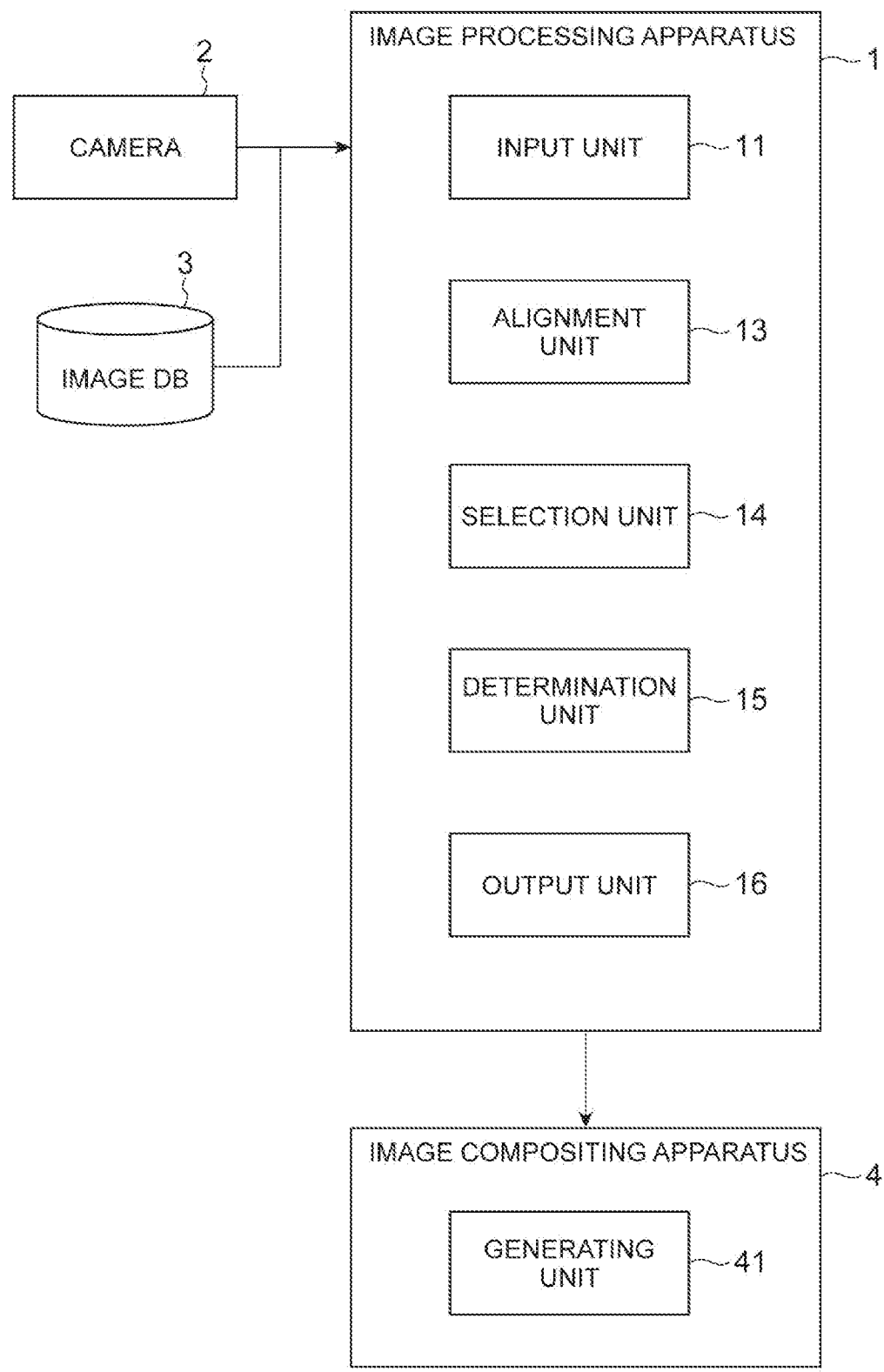
FIG. 1 is a schematic diagram for explaining the function of the image processing apparatus according to the first embodiment.

Hereinafter, various exemplary embodiments are described below.

In the following description, the same or corresponding components are attached by the same reference numerals, and description thereof will not be repeated.

First Embodiment

[Functions of Image Processing Apparatus]

FIG. 1 is a schematic diagram for explaining the function of the image processing apparatus according to the first embodiment. As illustrated in FIG. 1, an image processing apparatus 1 is connected to camera 2, an image database 3 (an image DB 3), and an image compositing apparatus 4. The image processing apparatus 1 selects a base image for processing a plurality of images and an image to be processed together with the base image from a plurality of images.

The image processing apparatus 1 acquires a plurality of images to be processed from the camera 2. The camera 2 has a movie shooting function or a continuous shooting function for still images. That is, the plurality of images are still images arranged in time series sequence. The plurality of images may include three or more images. The image processing apparatus 1 may acquire a plurality of images from the image database 3. The image database 3 is a storage medium that stores a plurality of images in advance. The method of acquiring the plurality of images is not limited to the above-described. For example, the image processing apparatus 1 may be connected to either the camera 2 or the image database 3. Alternatively, the image processing apparatus 1 may acquire a plurality of images from other devices different from the camera 2 and the image database 3 via communication.

The image processing apparatus 1 selects and outputs a plurality of images to be used for processing from among the plurality of acquired images. In the example of FIG. 1, the image processing apparatus 1 outputs a plurality of images to the image compositing apparatus 4. The image processing apparatus 1 can also output information indicating an image serving as a base of processing among a plurality of images. The image compositing apparatus 4 is a device for generating a high-resolution image, an image in which noise is reduced, or the like by using a plurality of images. The image compositing apparatus 4 includes a generating unit 41. The generating unit 41 generates at least one high-resolution image, an image with reduced noise, or the like with reference to one base image designated from among a plurality of images. As an example, the generating unit 41 performs alignment of other images excluding the base image among the plurality of images based on image feature of the base image. The generating unit 41 composites the base image and other images in consideration of a moving object region as necessary, and generates a high-resolution image. The output destination of the image processing apparatus 1 is not limited to the image compositing apparatus 4. For example, the output destination of the image processing apparatus 1 may be an apparatus that does not output an image as a result but internally processes overlapping regions of a plurality of images, and may be, for example, an object recognition apparatus or an object tracking apparatus. Alternatively, the output destination of the image processing apparatus 1 may be a database that stores data for these apparatuses.

Figure 2:
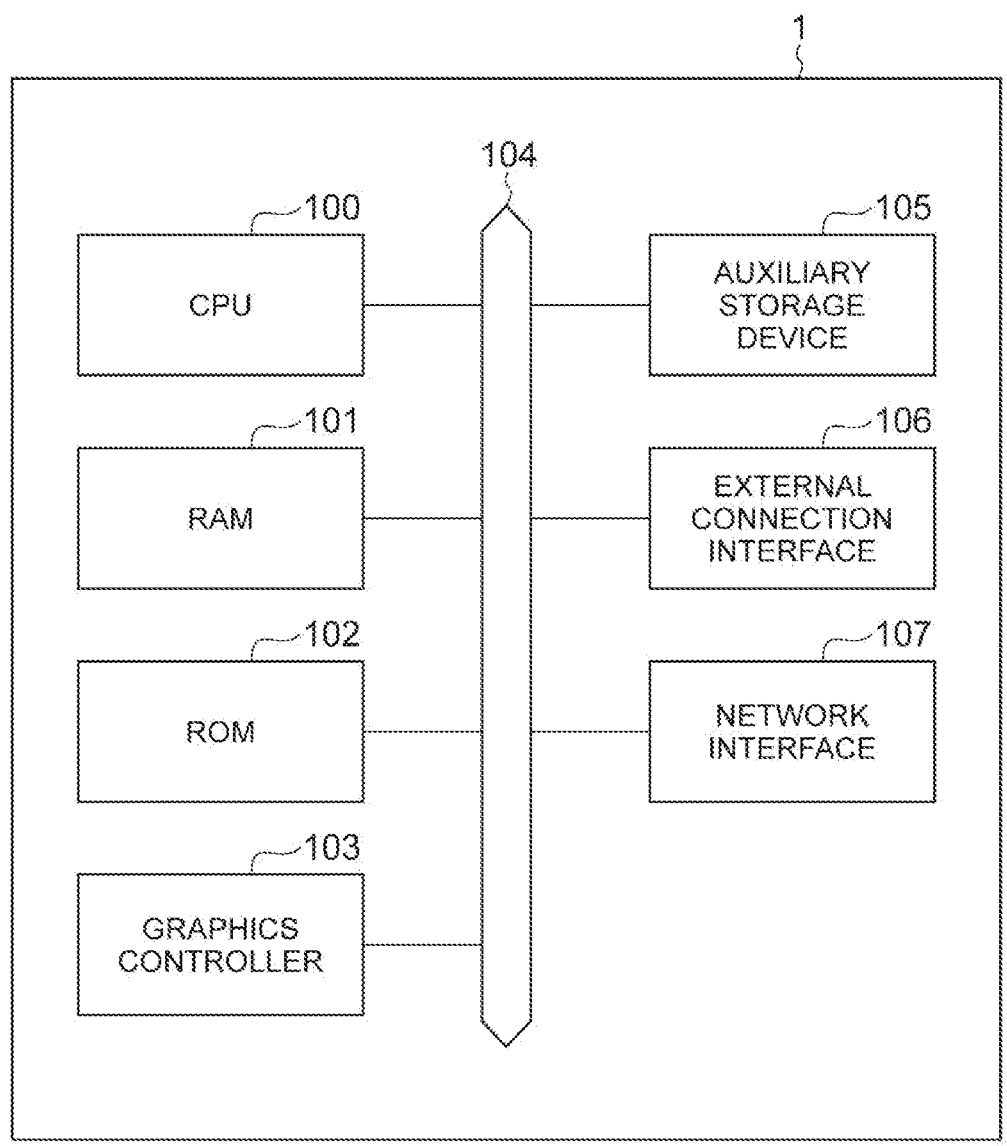
FIG. 2 is a schematic diagram illustrating hardware of the image processing apparatus according to the first embodiment.

The image processing apparatus 1 includes, as functional components, an input unit 11, an alignment unit 13, a selection unit 14, a determination unit 15, and an output unit 16. The functions performed by these components are realized by the hardware illustrated in FIG. 2. FIG. 2 is a schematic diagram illustrating hardware of the image processing apparatus according to the first embodiment. As illustrated in FIG. 2, the image processing apparatus 1 is configured as an ordinary computer system including a CPU (Central Processing Unit) 100, a RAM (Random Access Memory) 101, a ROM (Read Only Memory) 102, a graphics controller 103, a bus 104, an auxiliary storage device 105, an external connection interface 106, and a network interface 107. The components except for the bus 104 are communicably connected via the bus 104.

CPU 100 includes arithmetic circuits and performs overall control of the image processing apparatus 1. CPU 100 reads the programs stored in ROM 102 or the auxiliary storage device 105 to RAM 101. CPU 100 executes various processes based on the programs read out to RAM 101. ROM 102 stores a system program and the like used for controlling the image processing apparatus 1. The graphic controller 103 generates a screen to be displayed on the display device. The auxiliary storage device 105 stores application programs and the like for executing various processes. The auxiliary storage device 105 includes, for example, an HDD (Hard Disk Drive), an SSD (Solid State Drive), and the like. The external connection interface 106 is an interface for connecting various peripheral devices to the image processing apparatus 1. For example, the external connection interface 106 connects a display, a keyboard, a mouse, or the like to the image processing apparatus 1. The network interface 107 is an interface for connecting to an external device for exchanging information via a network.

The image processing apparatus 1 may not include the graphic controller 103. The image processing apparatus 1 does not need to be accommodated in one housing as hardware, and may be separated into several apparatuses.

Functional components of the image processing apparatus 1 will be described with reference to FIG. 1 again. The input unit 11 receives input of a plurality of images. The input unit 11 receives input of a plurality of images from the camera 2 or the image database 3. As an example, the input unit 11 receives input of three or more still images arranged in time series sequence.

The alignment unit 13 selects each of the plurality of images one by one as a base image, and sets an image other than the base image as a comparison image corresponding to the base image. The base image is an image selected from a plurality of images for each alignment process, and is an image serving as a base when determining the relationship between the plurality of images. The image features of the base image are used when aligning with the comparison image. The image feature is a feature amount based on a pixel value, and is, for example, an array of luminance values, an edge intensity, or the like. Alignment is the process of aligning the positions between images based on image features. When an image composite is performed in the subsequent process, the base image is an object to which other images among the plurality of images are composited. As an example, the alignment unit 13 selects one base image from a plurality of images, and performs alignment process with a corresponding comparison image using the selected one base image as a base. When the alignment process is completed, the next base image is selected from the plurality of images, and the alignment process is repeated with the selected next base image as a base. In this manner, the alignment unit 13 performs the alignment process for at least the number of images. For example, the alignment unit 13 may select the base images in time series order from among the plurality of images. The alignment unit 13 selects a base image from among the plurality of images so that each of the plurality of images becomes a base image at least once. In this manner, the alignment unit 13 aligns each of the base image and the comparison image for each base image based on the image feature.

The selection unit 14 selects, for each base image, a comparison image to be composited with the base image from the comparison images aligned with the base image. As an example, the selection unit 14 comprehensively selects a comparison image to be combined with the base image. For example, in a case where the first image G1 to the fourth image G4 are selection candidates and the first image G1 is a base image, the selection unit 14 selects 7 combinations of (G1, G2, G3, G4), (G1, G2, G3), (G1, G2, G4), (G1, G3), (G1, G4), (G1, G4). The selection unit 14 selects the combinations for each base image. For example, a combination in the case where the second image G2 is used as a base image, a combination in the case where the third image G3 is used as a base image, and a combination in the case where the fourth image G4 is used as a base image are comprehensively selected.

The selection unit 14 calculates, for each combination selected for each base image, a common region in which images included in the combination can be drawn in common. For example, in a case where the combination of images G1, G2, and G3, a region where all of the first image G1 to the third image G3 overlap is a common region. The common region may be a rectangular region included in a region where all images overlap. By setting the common region a rectangular region, calculation of a ratio to be described later becomes easy, so that the processing speed is improved. The common region may be the largest rectangular region included in the region where all the images overlap.

The selection unit 14 selects a combination in which the ratio of the common region to the base image is equal to or greater than a predetermined threshold. The selection unit 14 calculates the ratio of the common region to the base image for each combination, and compares the calculated ratio with a predetermined threshold. The predetermined threshold is a predetermined value for determining the ratio of the common region to the base image. When the ratio of the common region to the base image is expressed in percent, the predetermined threshold is set, for example, in the range of 50% to 95%. The predetermined threshold may be set in the range of 70 to 90%. When the ratio of the common region to the base image is expressed as a ratio, the predetermined threshold is set to, for example, a range of 0.5 to 0.95 or a range of 0.7 to 0.9. This ratio is also referred to as the overlap rate rc. The overlap rate rc is a value obtained by dividing the common region by the size of the image of the base image, and is a value greater than or equal to 0 and less than or equal to 1.

The determination unit 15 determines a combination in which the number of comparison images is the maximum from among the selected combinations. For example, in a case where the first image G1 is a base image, and two combinations (G1, G2, G3) and (G1, G2, G3, G4) are selected by the selection unit 14, the number of comparison images in the combination (G1, G2, G3) is two, and the number of comparison images in the combination (G1, G2, G3, G4) is three. In this case, the determination unit 15 determines that the combinations G1, G2, G3, and G4 are combinations in which the number of comparison images is the maximum.

The selection unit 14 and the determination unit 15 may efficiently search for a combination in which the number of comparison images is the maximum by performing cooperative operations in parallel. Details of the algorithm related to the search will be described later.

The output unit 16 outputs an image group corresponding to the determined combination and information indicating a base image corresponding to the image group. The image group corresponding to the determined combination is the base image and the comparison image included in the combination determined by the determination unit 15. The base image corresponding to the image group is a base image included in the combination, and the comparison image included in the combination is an image that is used as a base for alignment. The information indicating the base image is information capable of identifying the base image in the image group. For example, the information indicating the base image includes, but is not limited to, the ID assigned to the base image, Exif information, the order of arrangement in the image group, and the like.

The output unit 16 may rearrange the image groups in time series order and output the rearranged images. An image having a time series distance closer to that of the base image tends to be less likely to show ghosts at the time of composite process. By rearranging the images in time series order, the image compositing apparatus 4 can optimize the composite process. Alternatively, the output unit 16 may acquire the sharpness of each image, rearrange the images in the order of the sharpness, and output the images. When the number of images to be composited is limited, the image compositing apparatus 4 can optimize the composite process by rearranging the images in the order of sharpness.

As described above, the image processing apparatus 1 determines a combination of an optimal base image and a comparison image to be processed together with the base image from a plurality of images, and outputs the combination to the image compositing apparatus 4.

[Detail of Common Region]

Figure 3A:
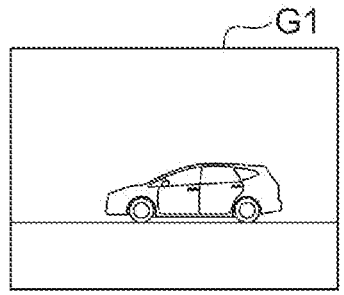
FIGS. 3A to 3D are diagrams illustrating a group of images to be aligned.
Figure 3B:
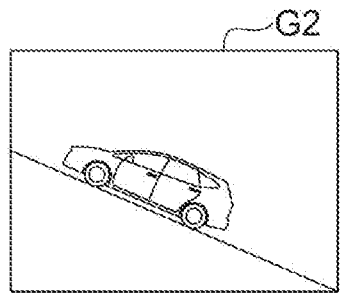
Figure 3C:
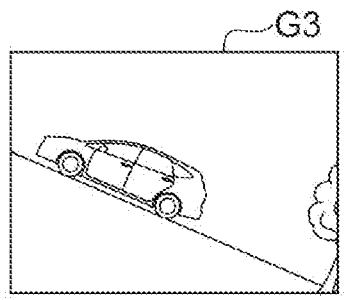
Figure 3D:
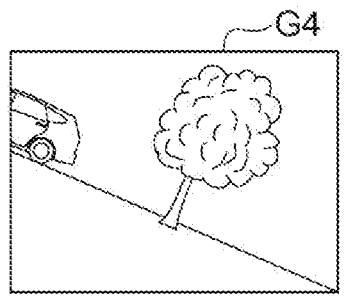

FIGS. 3A to 3D are diagrams illustrating a group of images to be aligned. The first image G1 illustrated in FIG. 3A, the second image G2 illustrated in FIG. 3B, the third image G3 illustrated in FIG. 3C, and the fourth image G4 illustrated in FIG. 3D are image groups imaged in time series in the order of illustration.

Figure 4A:
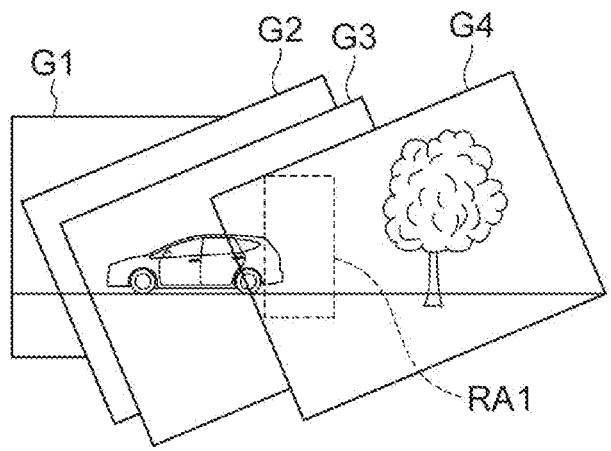
FIGS. 4A to 4C are diagrams for explaining the alignment of images.
Figure 4B:
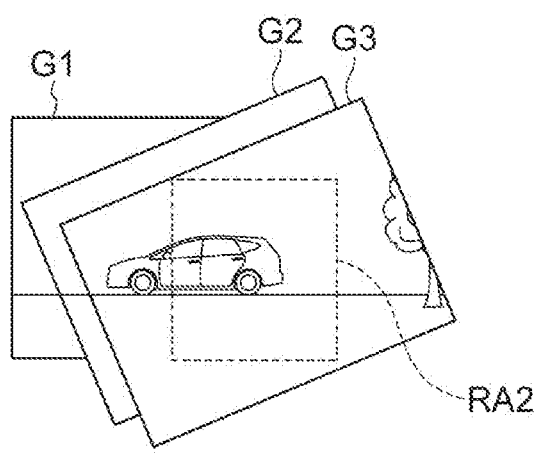
Figure 4C:
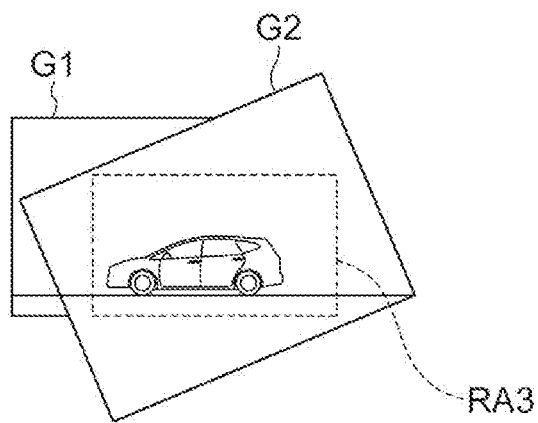

An example in which the base image is the first image G1 will be described with reference to FIGS. 4A to 4C. FIGS. 4A to 4C are diagrams for explaining the alignment of images. In a case where the base image is the first image G1, the comparison image is three images of the second image G2, the third image G3, and the fourth image G4 because the comparison image is an image other than the first image G1 among the plurality of images. FIG. 4A illustrates an example of alignment using all of the comparison images. As illustrated in FIG. 4A, three comparison images (second image G2, third image G3, and fourth image G4) are aligned with reference to the first image G1 which is the base image. The region where all four images overlap is the shared region RA1.

FIG. 4B illustrates an example of alignment using two of the comparison images. As illustrated in FIG. 4B, two comparison images (the second image G2 and the third image G3) are aligned with reference to the first image G1 which is the base image. The region where all three images overlap is the shared region RA2. Although illustration is omitted, the alignment unit 13 also performs alignment for other combinations of the two comparison images. For example, the combination of the second image G2 and the fourth image G4, the combination of the third image G3, and the fourth image G4 are also aligned in the same manner as the combination of the second image G2 and the third image G3, and the common region is calculated for each combination by the selection unit 14.

FIG. 4C illustrates an example of alignment using one of the comparison images. As illustrated in FIG. 4C, one comparison image (second image G2) is aligned with reference to the first image G1 which is the base image. A region where two images overlap is a shared region RA3. Although illustration is omitted, the alignment unit 13 also performs alignment for other combinations of one comparison image. For example, the combination of the third image G3 and the combination of the fourth image G4 are also aligned in the same manner as the combination of the second image G2, and the common region is calculated for each combination by the selection unit 14.

In this manner, the alignment unit 13 performs alignment of the comparison image with respect to the base image, and the selection unit 14 calculates the common region for each combination of the base image and the comparison image. The selection unit 14 calculates the overlap ratio using the calculated common region, and selects a combination in which the overlap ratio is equal to or greater than a predetermined threshold.

[Details of Search Algorithm]

The selection unit 14 and the determination unit 15 determine a combination in which the overlap rate rc is equal to or greater than a predetermined threshold and the maximum number of comparison images is obtained. There are several decision flows. In the first determination flow, with respect to the image group aligned by the alignment unit 13, the selection unit 14 selects all combinations in which the overlap ratio rc is equal to or greater than a predetermined threshold, and the determination unit 15 determines a combination in which the comparison image is the maximum number from among the selected combinations.

The second decision flow is improved to efficiently perform the search by the first decision flow. In the second determination flow, first, it is determined whether or not the overlap rate rc is equal to or greater than a predetermined threshold by combining the maximum number of comparison images with respect to the base image. When there is a combination in which the overlap rate rc is equal to or greater than the predetermined threshold among the combinations including the maximum number of comparison images, the selection unit 14 does not perform the subsequent search process, and the determination unit 15 determines the combination as a combination in which the maximum number of comparison images is obtained. That is, the selection unit 14 and the determination unit 15 improve the efficiency of the processing by searching for a combination having the maximum number of comparison images.

Figure 5:
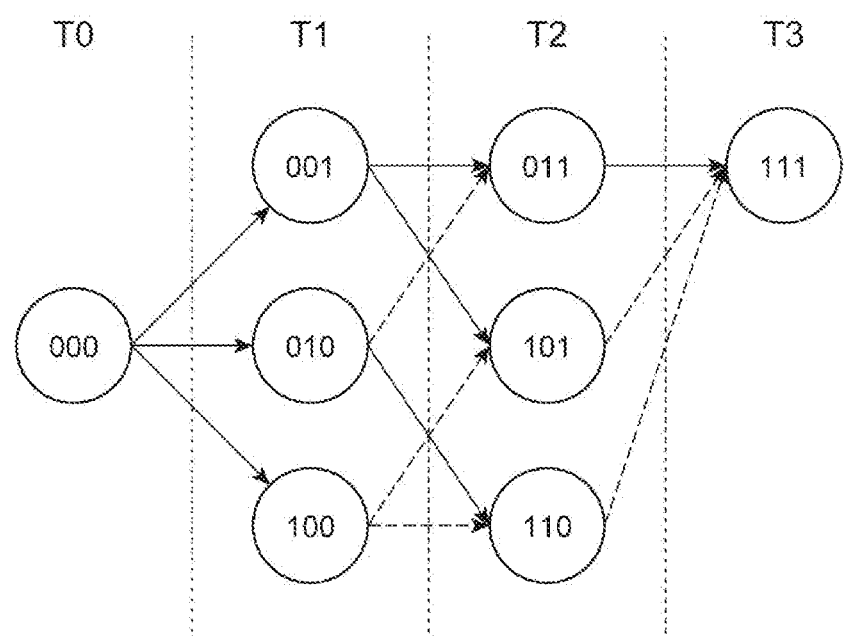
FIG. 5 is a tree structure illustrating an algorithm related to a search.

FIG. 5 is a tree structure illustrating an algorithm related to a search. FIG. 5 illustrates an example of searching for a combination of four images in the second decision flow. One of the four images is a base image, and the other three are comparison images. For example, the base image is the first image G1, and the comparison images are the second image G2 to the fourth image G4. As illustrated in FIG. 5, the leftmost node of the tree structure is the root, and the node indicates the use state of the comparison image in bit form. For example, the state "000" corresponds to a state in which all of the second image G2 to the fourth image G4 are used. The state "001" corresponds to a state in which the second image G2 and the third image G3 are used. The state "010" corresponds to a state in which the second image G2 and the fourth image G4 are used. The state "100" corresponds to a state in which the third image G3 and the fourth image G4 are used. The state "011" corresponds to a state in which the second image G2 is used. The state "101" corresponds to a state in which the third image G3 is used. The state "110" corresponds to a state in which the fourth image G4 is used. The state "111" corresponds to a state in which no image is used. Each node is hierarchized from the hierarchy T0 to the hierarchy T3 according to the number of comparison images used. The state "000" as the root is the hierarchy T0, and the number of comparison image is three. The states "001", "010", and "100" are the hierarchy T1, and the number of comparison image is two. The states "011", "101", and "110" are the hierarchy T2, and the number of comparison image is one. The state "111" is the hierarchy T3, and the number of comparison image is 0. Thus, the number of comparison images decreases each time the hierarchy is deepened starting from the root.

The selection unit 14 and the determination unit 15 start searching from the state "000" which is the root. In a case where the combination of the states "000" is one and the overlap rate rc is equal to or greater than the predetermined threshold in this one combination, the determination unit 15 determines that the combination is the optimal combination, and the subsequent processing is not performed. When the overlap rate rc of the combinations in the route is less than the predetermined threshold, the selection unit 14 and the determination unit 15 shift the processing from the hierarchy T0 to the hierarchy T1. The comparison image to be processed in the hierarchy T1 is a total of two images obtained by subtracting one image from the state "000". The comparison image to be processed in the hierarchy T2 is a total of one image obtained by further subtracting one image. In the hierarchies T1 and T2, similarly to the processing of the hierarchy T0, when the overlap rate rc is equal to or greater than the predetermined threshold, the determination unit 15 determines that the combination is the optimal combination, and the subsequent processing is not performed. That is, in a case where there is a combination satisfying the condition in the hierarchy, the search is terminated without shifting to the next hierarchy. By executing this algorithm, the processing may be faster. FIG. 5 illustrates a tree structure corresponding to one base image. That is, in a case where there are five images to be the base image, the process is performed along the tree structure illustrated in FIG. 5 for each base image (the processing is performed five times in total).

[Image Processing Method]

FIG. 6 is a flowchart illustrating an image processing method according to the first embodiment. The image processing method illustrated in FIG. 6 is executed by the image processing apparatus 1. The image processing apparatus 1 starts the image processing method illustrated in FIG. 6, for example, when a processing operation by a user is received.

In S10, the input unit 11 of the image processing apparatus 1 receives input of a plurality of images. For example, the input unit 11 receives input of four images, which are illustrated in FIGS. 3A to 3D.

In S12, the alignment unit 13 of the image processing apparatus 1 selects each of the plurality of images one by one as a base image. Then, the alignment unit 13 aligns the base image and each of the comparison images, which are images excluding the base image among the plurality of images, for each of the base images based on the image features. For example, the alignment unit 13 aligns the comparison image with the first image G1 as the base image. Similarly, the alignment unit 13 aligns the comparison image with the second image G2 as a base image. Similarly, the alignment unit 13 aligns the comparison image with the third image G3 as the base image. Similarly, the alignment unit 13 aligns the comparison image with the fourth image G4 as a base image.

In S14, the selection unit 14 of the image processing apparatus 1 selects, for each base image, a comparison image to be combined with the base image from the comparison images aligned with the base image. Then, the selection unit 14 calculates a common region, which is a region in which images included in the combination can be drawn in common. For example, as illustrated in FIGS. 4A to 4C, a common region is calculated in each combination. Subsequently, the selection unit 14 selects a combination in which the ratio of the common region to the base image is equal to or greater than a predetermined threshold. For example, in the example of FIGS. 4A to 4C, it is assumed that the overlap rate rc1 of the common region RA1 is 0.3, the overlap rate rc2 of the common region RA2 is 0.5, and the overlap rate rc3 of the common region RA3 is 0.8. If the predetermined threshold according to the overlap rate is 0.5, since the overlap rate rc1 of the common region RA1 is smaller than a predetermined threshold, the selection unit 14 does not select the combination illustrated in FIG. 4A, the combination illustrated in FIG. 4B or in FIG. 4C is selected.

In S16, the determination unit 15 of the image processing apparatus 1 determines, from among the selected combinations, a combination in which the number of comparison images is the maximum. The determination unit 15 determines a combination in which the number of comparison images is the maximum from combinations in which the ratio of the common region to the base image is equal to or greater than a predetermined threshold. For example, in a case where the combination illustrated in FIG. 4B or FIG. 4C is selected, the combination of FIG. 4B has two comparison images, and the combination of FIG. 4C has one comparison image. Therefore, the determination unit 15 determines that the combination of FIG. 4B in which the first image G1 is the base image is the combination in which the number of comparison images is the maximum.

In S18, the output unit 16 of the image processing apparatus 1 outputs an image group corresponding to the determined combination and information indicating a base image corresponding to the image group. When the output processing ends, the flowchart illustrated in FIG. 6 ends.

By executing the flowchart illustrated in FIG. 6, an optimum base image and a comparison image are selected from a plurality of images. Note that the selection processing (S14) and the determination processing (S16) may be simultaneously performed in parallel, and in this case, they may be operated by the algorithm illustrated in FIG. 5.

[Use Case where a Different Image is Selected as the Base Image]

For example, the alignment unit 13 may select the base images in time series order of the plurality of images. A use case in which a different image is selected as the base image will be described with reference to FIGS. 7A to 9C.

Figure 7A:
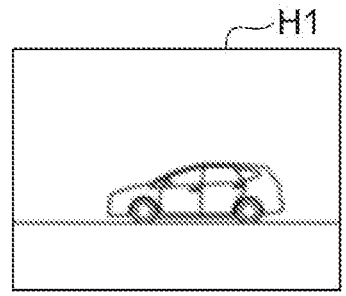
FIGS. 7A to 7D are diagrams illustrating a group of images to be aligned.
Figure 7B:
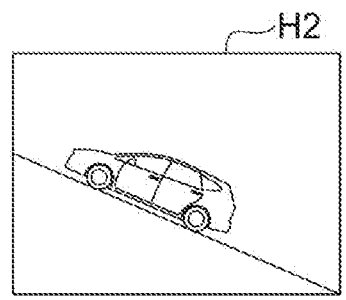
Figure 7C:
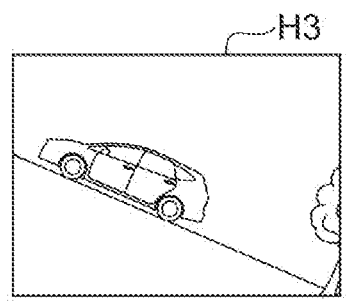
Figure 7D:
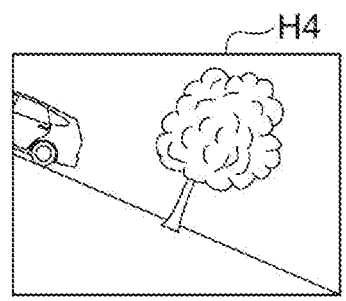

FIGS. 7A to 7D are diagrams illustrating a group of images to be aligned. The first image H1 illustrated in FIG. 7A, the second image H2 illustrated in FIG. 7B, the third image H3 illustrated in FIG. 7C, and the fourth image H4 illustrated in FIG. 7D are image groups imaged in time series in the order of illustration. The difference from the image group of FIGS. 3A to 3D is that blurring occurs in the first image H1.

Figure 8A:
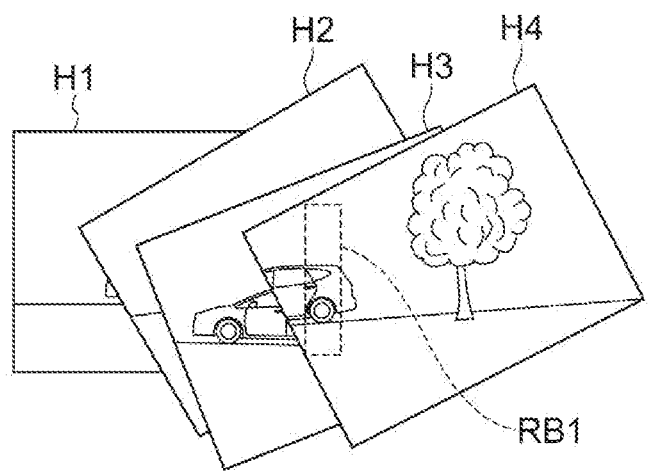
FIGS. 8A to 8C are diagrams for explaining the alignment of images.
Figure 8B:
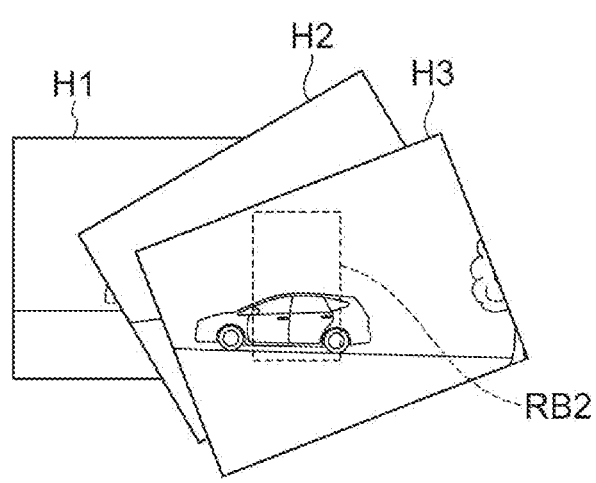
Figure 8C:
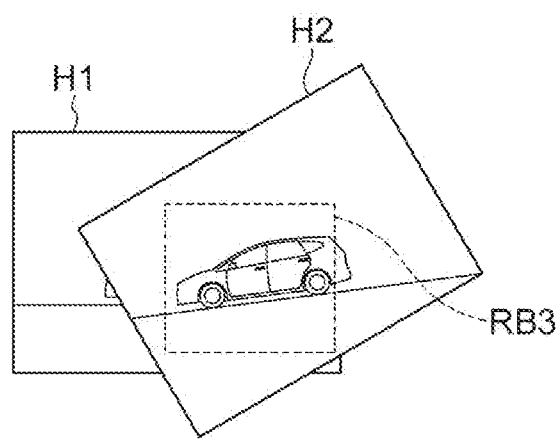

As an example, an example in which the first image H1 is selected as the base image will be described with reference to FIGS. 8A to 8C. FIGS. 8A to 8C are diagrams for explaining the alignment of images. In a case where the base image is the first image H1, the comparison image is three images of the second image H2, the third image H3, and the fourth image H4 because the comparison image is an image other than the first image H1 among the plurality of images. FIG. 8A illustrates an example of alignment using all of the comparison images. As illustrated in FIG. 8A, three comparison images (the second image H2, the third image H3, and the fourth image H4) are aligned with reference to the first image H1 which is the base image. The region where all four images overlap is the shared region RB1.

FIG. 8B illustrates an example of alignment using two of the comparison images. As illustrated in FIG. 8B, two comparison images (the second image H2 and the third image H3) are aligned with reference to the first image H1 which is the base image. The region where all three images overlap is the shared region RB2. Although illustration is omitted, the alignment unit 13 also performs alignment for other combinations of the two comparison images. For example, the combination of the second image H2 and the fourth image H4, the third image H3, and the fourth image H4 is also aligned in the same manner as the combination of the second image H2 and the third image H3, and the common region is calculated for each combination by the selection unit 14.

FIG. 8C illustrates an example of alignment using one of the comparison images. As illustrated in FIG. 8C, one comparison image (second image H2) is aligned with reference to the first image H1 which is the base image. A region where two images overlap is a shared region RB3. Although illustration is omitted, the alignment unit 13 also performs alignment for other combinations of one comparison image. For example, the combination of the third image H3 and the combination of the fourth image H4 are also aligned in the same manner as the combination of the second image H2, and the common region is calculated for each combination by the selection unit 14.

In general, when blurring occurs in either or both of the images in the alignment of the two images, the motion vector amount between the images cannot be accurately calculated. As a result, since the alignment is performed based on the motion vector amount including the error, the accuracy of the alignment of the plurality of images is lowered. FIGS. 8A to 8C illustrate states in which the base image (first image H1) and the comparison image (second image H2 to fourth image H4) are not properly aligned.

Figure 9A:
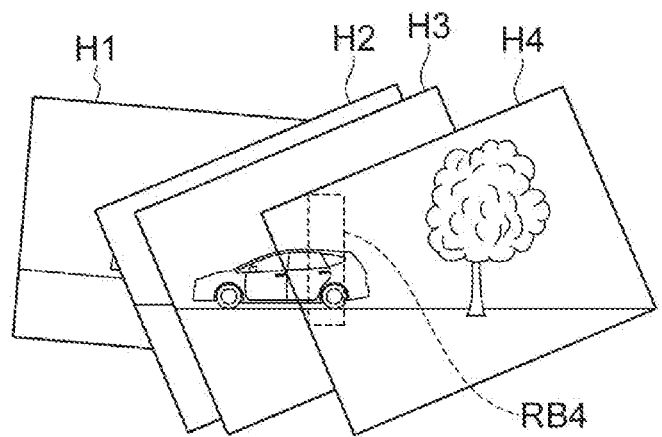
FIGS. 9A to 9C are diagrams for explaining the alignment of images.
Figure 9B:
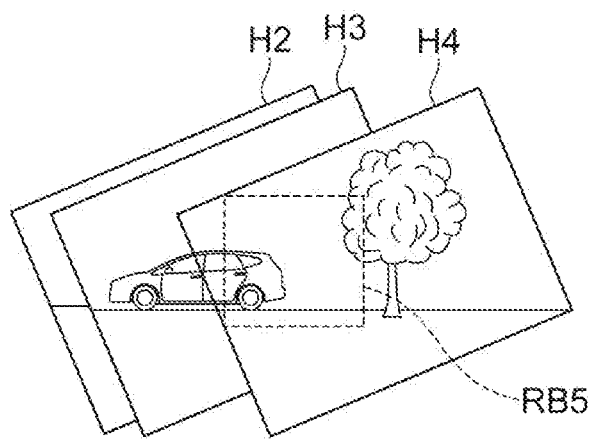
Figure 9C:
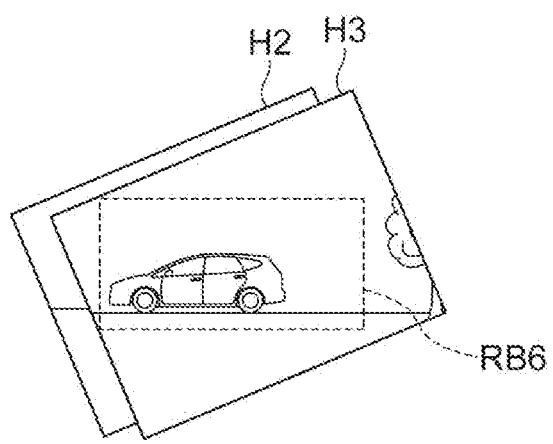

Next, as an example, an example in which the second image H2 is selected as the base image will be described with reference to FIGS. 9A to 9C. FIGS. 9A to 9C are diagrams for explaining the alignment of images. In a case where the base image is the second image H2, the comparison image is three images of the first image H1, the third image H3, and the fourth image H4 because the comparison image is an image other than the second image H2 among the plurality of images. FIG. 9A illustrates an example of alignment using all of the comparison images. As illustrated in FIG. 9A, three comparison images (first image H1, third image H3, and fourth image H4) are aligned with reference to the second image H2 which is the base image. The region where all four images overlap is the shared region RB4. As illustrated in FIG. 9A, while the second image H2 and the first image H1 are misaligned, the second image H2, the third image H3, and the fourth image H4 are appropriately aligned. This is because no blurring has occurred in the second image H2 to the fourth image H4, and the alignment has been performed based on the motion vector amount calculated accurately.

FIG. 9B illustrates an example of alignment using two of the comparison images. As illustrated in FIG. 9B, two comparison images (the third image H3 and the fourth image H4) are aligned with reference to the second image H2 which is the base image. The region where all three images overlap is the shared region RB5. Although illustration is omitted, the alignment unit 13 also performs alignment for other combinations of the two comparison images. For example, the combination of the first image H1 and the fourth image H4, the first image H1, and the third image H3 is also aligned in the same manner as the combination of the third image H3 and the fourth image H4, and the common region is calculated for each combination by the selection unit 14.

FIG. 9C illustrates an example of alignment using one of the comparison images. As illustrated in FIG. 9C, one comparison image (third image H3) is aligned with the second image H2, which is the base image, as a base. A region where two images overlap is a shared region RB6. Although illustration is omitted, the alignment unit 13 also performs alignment for other combinations of one comparison image. For example, the combination of the first image H1 and the combination of the fourth image H4 are also aligned in the same manner as the combination of the third image H3, and the common region is calculated for each combination by the selection unit 14.

As illustrated in FIGS. 8A to 8C and FIGS. 9A to 9C, if blurring occurs in either or both of the base image and the comparison image, the reliability of the alignment is inferior as compared with the case where no blurring occurs. When the reliability of the alignment is low, the calculated common region is relatively small, and when the reliability is high, the calculated common region is relatively large. FIG. 8B and FIG. 9B illustrate states in which the common region RB5 calculated when the reliability of the alignment is high is larger than the common region RB2 calculated when the reliability is low. Similarly, FIG. 8C and FIG. 9C illustrate states in which the common region RB6 calculated when the reliability of the alignment is high is larger than the common region RB3 calculated when the reliability is low.

As described above, the alignment unit 13 selects the base image from the plurality of images so that each of the plurality of images becomes the base image at least once. Therefore, even when a blurred image is included in a plurality of images, it is possible to suppress a combination of images to be aligned in a misaligned manner using the blurred image as a base image from being selected as it is. As a result, the image processing apparatus 1 can determine a more appropriate combination of the base image and the comparison image to be processed together with the base image from the plurality of images.

[Programs]

The program causes the computer to function as the image processing apparatus 1. The computer is hardware including a computing device and a storage medium, and is a personal computer, a server, a portable terminal, or the like. The program comprises a main module, an input module, an alignment module, a selection module, a determination module, and an output module. The main module is a part that controls the entire apparatus. The functions realized by executing the input module, the alignment module, the selection module, the determination module, and the output module are identical to the functions of the input unit 11, the alignment unit 13, the selection unit 14, the determination unit 15, and the output unit 16 of the image processing apparatus 1 described above.

The program is provided by a non-transitory recording medium such as a ROM or a semiconductor memory, for example. The program may also be provided via communication, such as a network.

Summary of the First Embodiment

In a typical technique for setting a base image, one image arbitrarily selected from a plurality of images is selected as a base image, and the plurality of images are aligned. However, in a case where one selected image is blurred, an error occurs in the amount of motion vectors calculated from the base image and other images to be aligned. As a result, the accuracy of the alignment of a plurality of images is lowered, and the image quality cannot be expected to be improved by the image composition.

On the other hand, in order to improve the accuracy of the alignment of a plurality of images, a method of selecting an image having the highest sharpness from a plurality of images is conceivable. Generally, the smaller the texture region in an image, the lower the sharpness of the image, and the larger the texture region in an image, the greater the sharpness of the image. For example, a case where an image having the highest sharpness is selected from the first image G1 to the fourth image G4 illustrated in FIGS. 3A to 3D is considered. In this case, there is a high possibility that the fourth image G4 having the largest leaf texture region is selected as the image having the highest sharpness. However, such a fourth image G4 is not necessarily an image having a position close to the main subject (vehicle). As described above, if an image having the highest sharpness is simply selected, image quality improvement by image composition may not be expected.

According to the image processing apparatus 1 of the first embodiment, all of the plurality of input images are set as base images, and a combination satisfying the overlap rate rc equal to or greater than a predetermined threshold is selected. In the case of improving the image quality or the recognition accuracy by using a plurality of images, the effect decreases as the common region becomes smaller. The image processing apparatus 1 can avoid a reduction in the effect obtained by processing a plurality of images by selecting a combination in which the overlap rate rc is equal to or greater than a predetermined threshold. Further, in the case of improving the image quality or the recognition accuracy by using a plurality of images, the effect increases as the number of comparison images increases. The image processing apparatus 1 can maximize the effect of the subsequent image processing by determining a combination that maximizes the number of comparison images among the determined combinations. Therefore, the image processing apparatus 1 can appropriately select a base image for processing a plurality of images and an image to be processed together with the base image from a plurality of images.

Second Embodiment

The image processing apparatus 1A according to the second embodiment differs from the image processing apparatus 1 according to the first embodiment in part of the functions of the determination unit 15A, and is otherwise the same as the image processing apparatus 1 according to the first embodiment. In the following description, differences from the image processing apparatus 1 will be mainly described, and description thereof will not be repeated.

Figure 10:
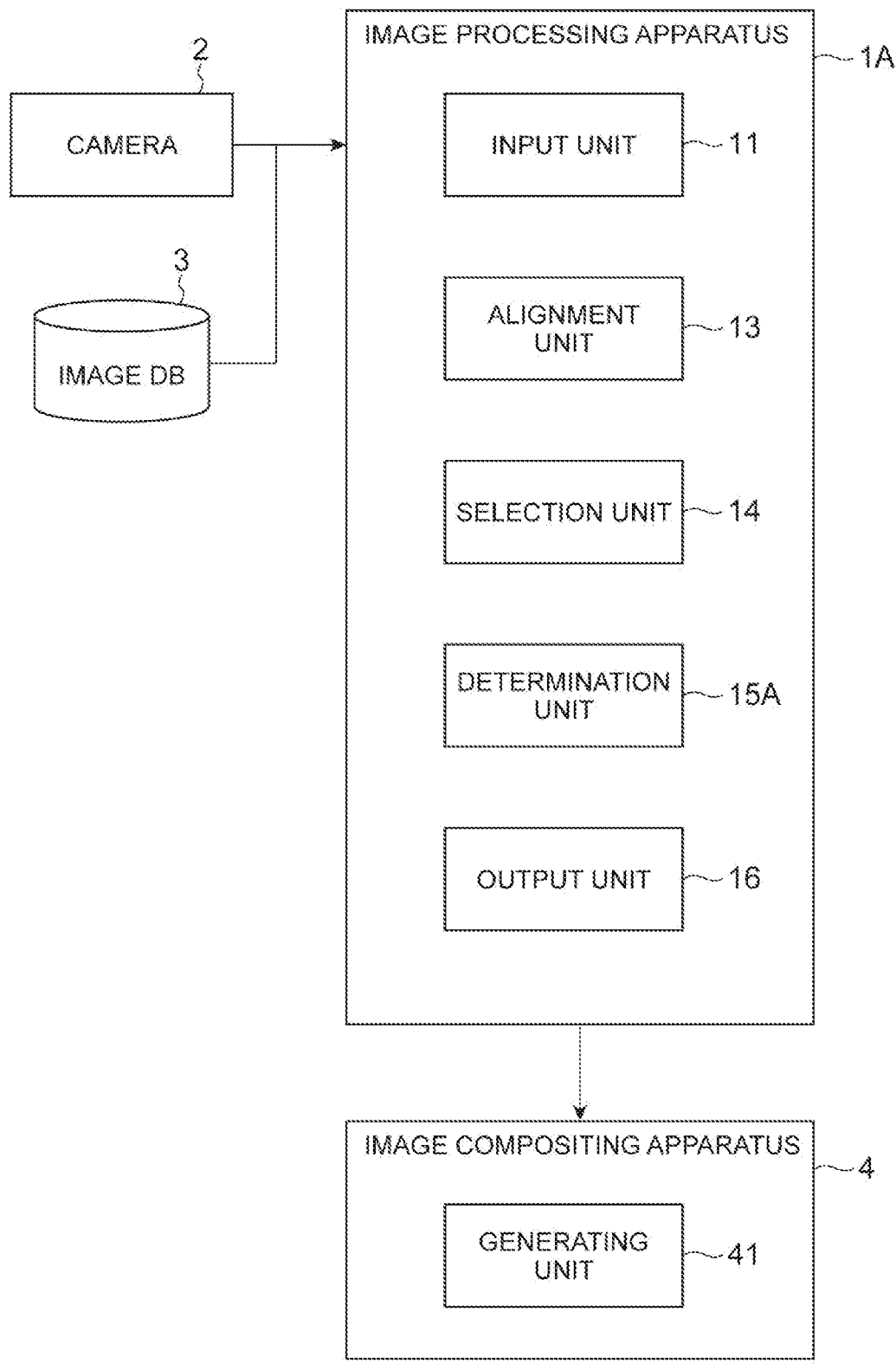
FIG. 10 is a schematic diagram for explaining the function of the image processing apparatus according to the second embodiment.

FIG. 10 is a schematic diagram for explaining the function of the image processing apparatus according to the second embodiment. As illustrated in FIG. 10, the image processing apparatus 1A is the same as the image processing apparatus 1 except that it includes a determination unit 15A. The determination unit 15A has the same function as that of the determination unit 15, and further has an additional function. Specifically, in a case where there are a plurality of combinations in which the number of comparison images is the maximum number, the determination unit 15A determines a combination in which the corresponding common region is larger from the combinations in which the number of comparison images is the maximum number. In this case, a combination having the largest common region is selected from the combinations in which the number of comparison images is the maximum number.

The case where four images of the first image G1, the second image G2, the third image G3, and the fourth image G4 are processed will be exemplified. It is assumed that the first image G1 is a base image, the overlap rate rc of the combinations (G1, G2, G3) is 0.8, the overlap rate rc of the combinations (G1, G2, G4) is 0.7, and the predetermined threshold for the overlap rate is 0.6. Further, it is assumed that the number of comparison images is two and the maximum number of comparison images is also two. In this case, both of the two combinations satisfy the condition that the overlap rate rc is equal to or greater than the predetermined threshold and the comparison image has the maximum number of images.

The determination unit 15A determines the combination of the two combinations that satisfy the above-mentioned condition, in which the common region is larger, that is, the combination of the two combinations having a larger overlap rate rc. In the above example, the overlap rate rc of the combination (G1, G2, G3) is larger than the overlap rate rc of the combination (G1, G2, G4). Therefore, the determination unit 15A employs the combinations G1, G2, and G3.

The function of the decision unit 15A can also be incorporated into the algorithm of the tree structure illustrated in FIG. 5. When processing a hierarchy in which a plurality of nodes exist in the tree structure, the determination unit 15A holds the calculation result for each node of the overlap rate rc until the processing of all the nodes of the same hierarchy is completed. Then, the determination unit 15A determines a combination in which the overlap rate rc is equal to or greater than a predetermined threshold and the maximum overlap rate rc is obtained from the calculation result for each node. As described above, the determination unit 15A can determine an optimal one combination even when there are a plurality of combinations in which the number of comparison images is the maximum number of images, that is, even when there are a plurality of nodes satisfying a condition in which the overlap rate rc is equal to or greater than a predetermined threshold in the same hierarchy.

The determination unit 15A does not need to hold all the calculation results for each node in the same hierarchy, and only the calculation results of the nodes corresponding to the maximum value of the overlap rate rc that becomes equal to or greater than the predetermined threshold in the same hierarchy are recorded. For example, in the case of processing in order of states "001", "010" and "100" in the hierarchy T1 of FIG. 5, it is assumed that the overlap rate rc is equal to or greater than a predetermined threshold in all the states. In this case, first, the overlap rate rc calculated in the processing of the state "001" is recorded as an initial value. The overlap rate rc is recorded in association with the corresponding state. Subsequently, in a case where the overlap rate rc calculated in the processing of the state "010" is larger than the recorded overlap rate rc, the recorded overlap rate rc is rewritten, and the state associated with the overlap rate rc is also changed. In a case where the overlap rate rc calculated in the processing of the state "010" is equal to or less than the recorded overlap rate rc, the recorded overlap rate rc is not changed. Subsequently, in a case where the overlap rate rc calculated in the processing of the state "100" is larger than the recorded overlap rate rc, the recorded overlap rate rc is rewritten, and the state associated with the overlap rate rc is also changed. In a case where the overlap rate rc calculated in the processing of the state "100" is equal to or less than the recorded overlap rate rc, the recorded overlap rate rc is not changed. In this manner, the determination unit 15A can reduce resources by holding only the calculation result of the combination which becomes the provisional maximum value.

Summary of the Second Embodiment

According to the image processing apparatus 1A of the second embodiment, even when there are a plurality of combinations satisfying the condition that the overlap rate rc is equal to or greater than the predetermined threshold and the comparison image is the maximum number of images, it is possible to appropriately select a combination capable of maximizing the effects of the subsequent image processing from the plurality of combinations satisfying the condition using the overlap rate rc.

Third Embodiment

The image processing apparatus 1B according to the third embodiment differs from the image processing apparatus 1 according to the first embodiment in that the image processing apparatus 1 includes the acquiring unit 12 and a part of functions of the determination unit 15B, and is otherwise the same. In the following description, differences from the image processing apparatus 1 will be mainly described, and description thereof will not be repeated.

Figure 11:
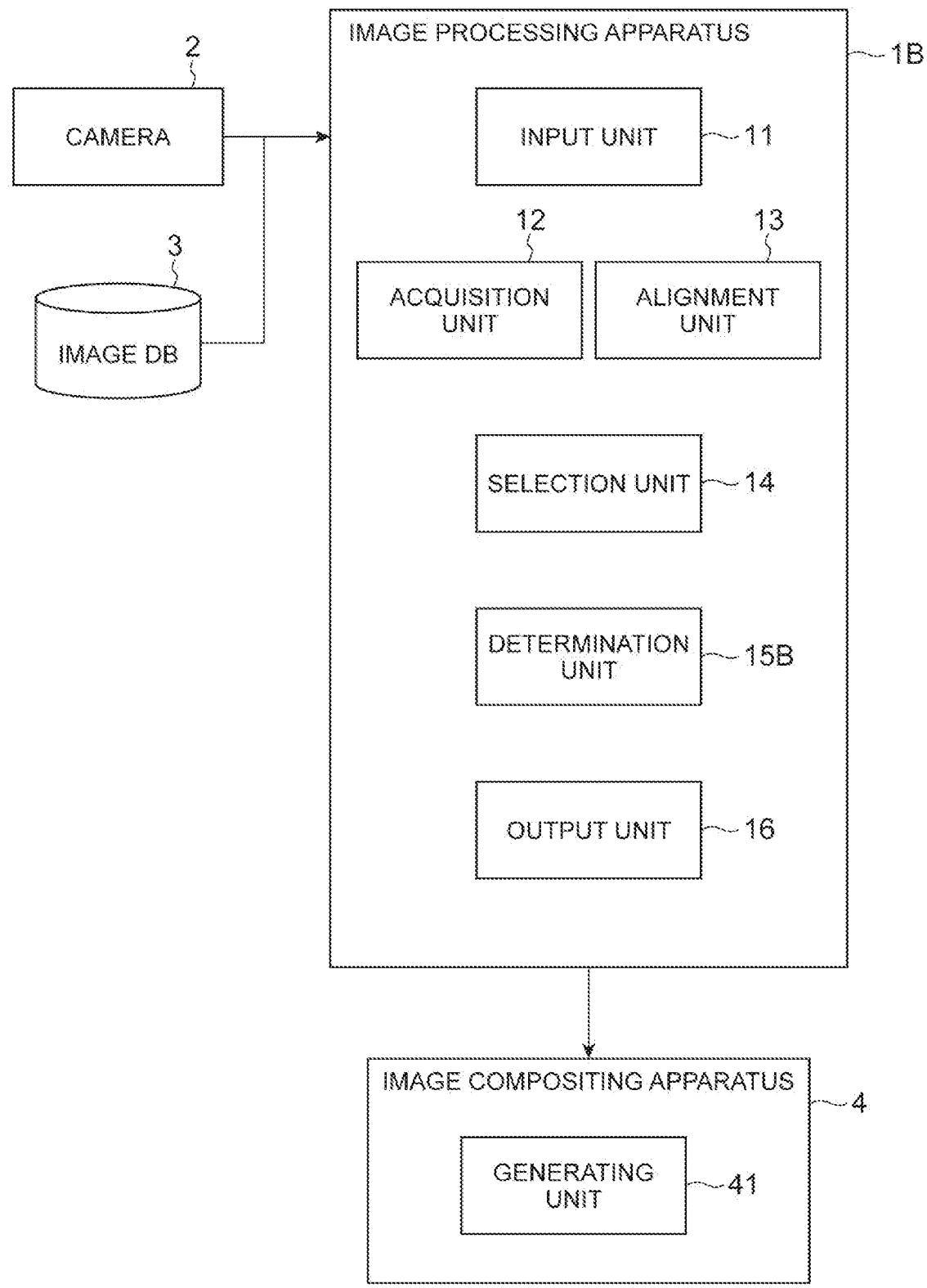
FIG. 11 is a schematic diagram for explaining the function of the image processing apparatus according to the third embodiment.

FIG. 11 is a schematic diagram for explaining the function of the image processing apparatus according to the third embodiment. As illustrated in FIG. 11, the image processing apparatus 1B is the same as the image processing apparatus 1 except that it includes an acquiring unit 12 and a determination unit 15B.

The acquisition unit 12 acquires a feature amount from each designated region of a plurality of images. The designated region is a region set in advance for each image. That is, the designated regions are set corresponding to the respective images. The designated region may be a part of the image or may be the entire range of the image. The designated region is, for example, a region in which a face or a subject is determined by recognition process, but is not limited thereto. The feature amount is calculated from the pixel value, and is a value capable of evaluating the image quality. Examples of features include, but are not limited to, sharpness, noise, contrasts, and the like. It can be said that the larger the value of the feature amount is, the better the image quality is. The sharpness can be calculated using SAD (Sum of Absolute Difference) between the Gaussian blurred images using the different standard deviations 6 of the two intensities.

The determination unit 15B has the same function as that of the determination unit 15, and further has an additional function. Specifically, in a case where there are a plurality of combinations in which the number of comparison images is the maximum number, the determination unit 15B determines a combination in which the feature amount related to the combination is larger from the combinations in which the number of comparison images is the maximum number. In this case, the combination having the largest feature amount related to the combination is selected from the combinations in which the number of comparison images is the maximum number. The feature amount related to the combination is a sum or average value of the feature amounts of the respective images related to the combination.

The case where four images of the first image G1, the second image G2, the third image G3, and the fourth image G4 are processed will be exemplified. It is assumed that the first image G1 is a base image, the overlap rate rc of the combinations (G1, G2, G3) is 0.8, the feature amount related to the combination is P1, the overlap rate rc of the combinations (G1, G2, G4) is 0.7, the feature amount related to the combination is P2 (P1>P2), and the predetermined threshold related to the overlap rate is 0.6. Further, it is assumed that the number of comparison images is two and the maximum number of comparison images is also two. In this case, both of the two combinations satisfy the condition that the overlap rate rc is equal to or greater than the predetermined threshold and the comparison image has the maximum number of images.

The determination unit 15B determines the combination of the two combinations that satisfy the above-mentioned condition and the combination of which the feature amount related to the combination is larger. In the above example, the feature amount P1 related to the combination (G1, G2, G3) is larger than the feature amount P2 related to the combination (G1, G2, G4). Therefore, the determination unit 15B determines the combinations G1, G2, and G3.

The function of the decision unit 15B can also be incorporated into the algorithm of the tree structure illustrated in FIG. 5. When processing a hierarchy in which a plurality of nodes exist in the tree structure, the determination unit 15B holds the calculation result for each node of the overlap rate rc until the processing of all the nodes of the same hierarchy is completed. Then, the determination unit 15B determines a combination in which the overlap rate rc is equal to or greater than a predetermined threshold and the feature amount related to the combination is the maximum from among the calculation results for each node. As described above, the determination unit 15B can determine the optimum one combination even when there are a plurality of combinations in which the number of comparison images is the maximum number of images, that is, even when there are a plurality of nodes satisfying the condition that the overlap rate rc is equal to or greater than the predetermined threshold in the same hierarchy.

The determination unit 15B does not need to hold all the calculation results for each node in the same hierarchy, and only the calculation results of the nodes in the same hierarchy that are greater than or equal to a predetermined threshold and have the largest feature amount related to the combination need to be recorded. For example, in the case of processing in order of states "001", "010" and "100" in the hierarchy T1 of FIG. 5, it is assumed that the overlap rate rc is equal to or greater than a predetermined threshold in all the states. In this case, first, the feature amount relating to the combination calculated at the time of processing of the state "001" is recorded as an initial value. The feature amount relating to the combination is recorded in association with the corresponding state. Subsequently, in a case where the feature amount relating to the combination calculated at the time of processing of the state "010" is larger than the feature amount relating to the recorded combination, the feature amount relating to the recorded combination is rewritten, and the state associated with the feature amount relating to the combination is also changed. In a case where the feature amount relating to the combination calculated at the time of processing of the state "010" is equal to or less than the feature amount relating to the recorded combination, the feature amount relating to the recorded combination is not changed. Subsequently, in a case where the feature amount relating to the combination calculated at the time of processing of the state "100" is larger than the feature amount relating to the recorded combination, the feature amount relating to the recorded combination is rewritten, and the state associated with the feature amount relating to the combination is also changed. In a case where the feature amount relating to the combination calculated at the time of processing of the state "100" is equal to or less than the feature amount relating to the recorded combination, the feature amount relating to the recorded combination is not changed. In this manner, the determination unit 15B can reduce resources by holding only the calculation result of the combination which becomes the provisional maximum value.

[Image Processing Method]

Figure 12:
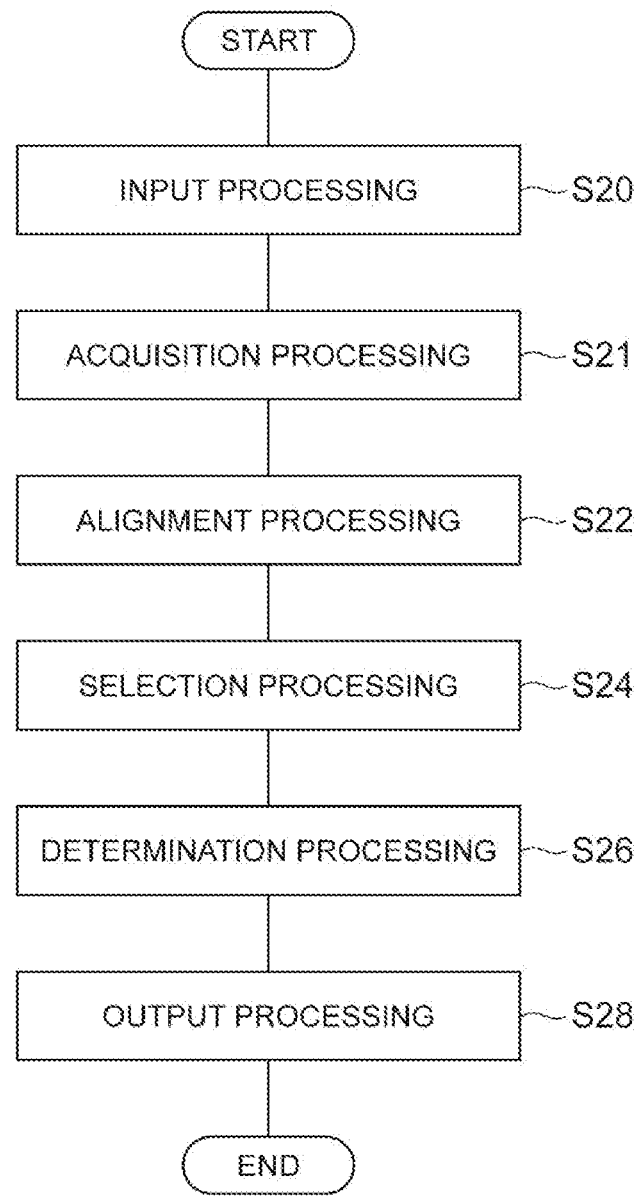
FIG. 12 is a flowchart illustrating an image processing method according to the third embodiment.

FIG. 12 is a flowchart illustrating an image processing method according to the third embodiment. The image processing process illustrated in FIG. 12 is executed by the image processing apparatus 1B. The image processing apparatus 1B starts the image processing method illustrated in FIG. 12, for example, when the image processing method accepts a processing operation by the user.

The input unit 11 of the image processing apparatus 1B receives input of a plurality of images as an input process S20. This processing is the same as the input processing in S10 of FIG. 6.

In S21, the acquisition unit 12 of the image processing apparatus 1B acquires the feature amounts from the designated regions of the plurality of images. The acquisition unit 12 acquires the feature amount from each of the images received in the input process. The acquisition unit 12 detects a designated region for each image, and acquires the sharpness and the like in the designated region.

The alignment unit 13 of the image processing apparatus 1B selects a base image and aligns a comparison image as the alignment processing in S22. This processing is the same as the alignment processing in S12 of FIG. 6.

The selection unit 14 of the image processing apparatus 1B selects, for each base image, a comparison image to be combined with the base image from the comparison images aligned with the base image as the selecting processing S24. Then, the selection unit 14 calculates a common region and an overlap rate rc, which are regions in which images included in the combination can be commonly drawn. This processing is the same as the selection processing in S14 of FIG. 6.

The determination unit 15B of the image processing apparatus 1B determines, as a determination processing S26, a combination in which the number of comparison images is the largest among the selected combinations. The determination unit 15B determines a combination in which the number of comparison images is the maximum among combinations in which the overlap rate rc is equal to or greater than a predetermined threshold. When there are a plurality of combinations in which the overlap rate rc is equal to or greater than the predetermined threshold and the number of comparison images is the maximum, the combination having the largest feature amount related to the combination is determined from the plurality of combinations.

In S28, the output unit 16 of the image processing apparatus 1 outputs an image group corresponding to the determined combination and information indicating a base image corresponding to the image group. This processing is the same as the output processing in S18 in FIG. 6. When the output processing ends, the flowchart illustrated in FIG. 12 ends.

By executing the flowchart illustrated in FIG. 12, an optimum base image and a comparison image are selected from a plurality of images. The acquisition processing (S21) and the alignment processing (S22) may be performed concurrently. The selection processing (S24) and the decision processing (S26) may be processed concurrently, in which case they may operate with the algorithm illustrated in FIG. 5.

Summary of the Third Embodiment

According to the image processing apparatus 1B of the third embodiment, even when there are a plurality of combinations that satisfy the condition that the overlap rate rc is equal to or greater than the predetermined threshold and the comparison image is the maximum number of images, it is possible to appropriately select a combination that can maximize the effects of the subsequent image processing from the plurality of combinations that satisfy the condition using the feature amounts relating to the combination.

Fourth Embodiment

The image processing apparatus 1C according to the fourth embodiment is different from the image processing apparatus 1 according to the first embodiment in that it includes a generating unit 41, and is otherwise identical to the image processing apparatus 1 according to the first embodiment. In the following description, differences from the image processing apparatus 1 will be mainly described, and description thereof will not be repeated.

Figure 13:
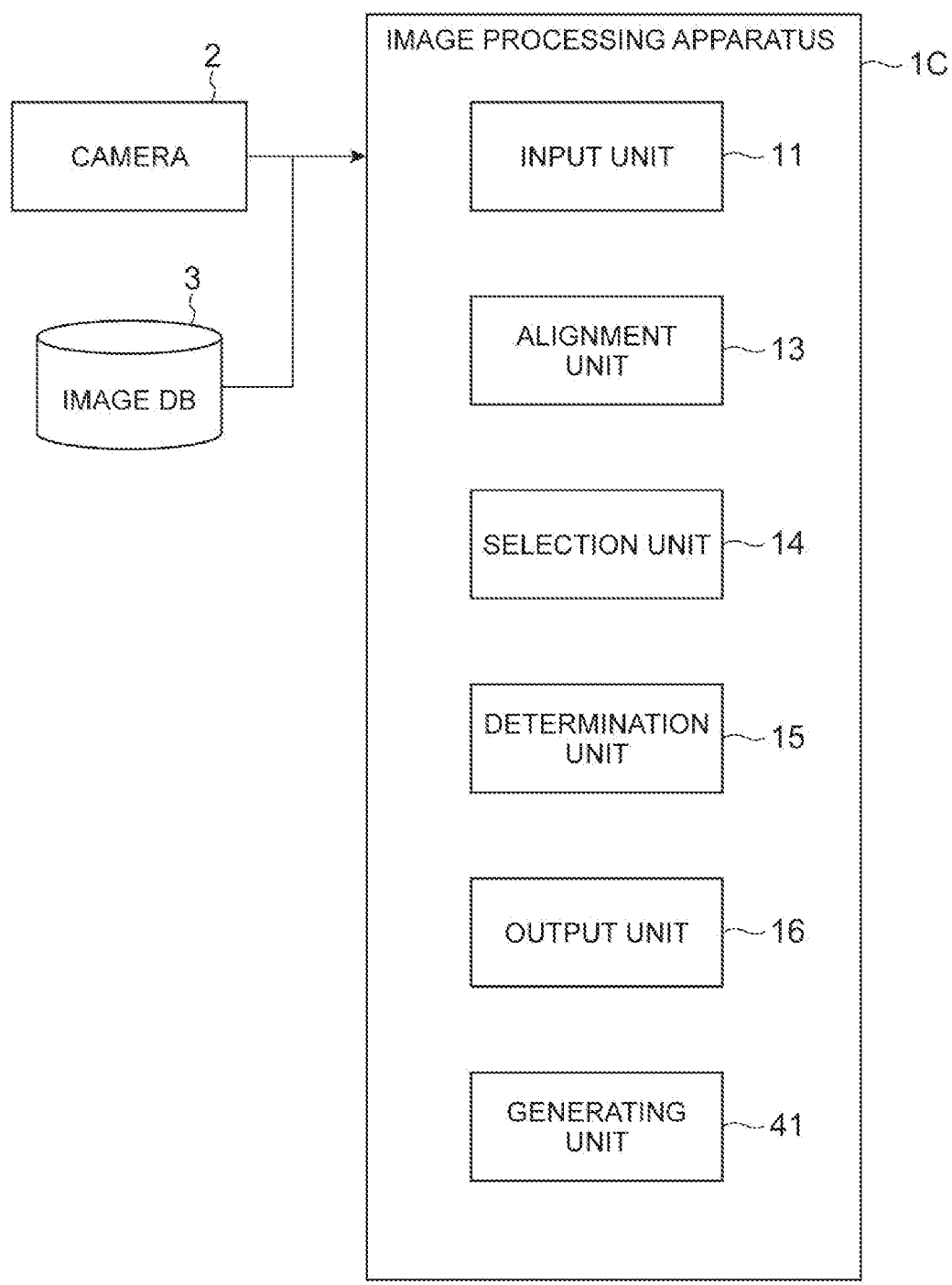
FIG. 13 is a schematic diagram for explaining the function of the image processing apparatus according to the fourth embodiment.

FIG. 13 is a schematic diagram for explaining the function of the image processing apparatus according to the fourth embodiment. As illustrated in FIG. 13, the image processing apparatus 1C includes a generating unit 41 as compared with the image processing apparatus 1, and the others are the same. The generating unit 41 is the same as the generating unit 41 of the image compositing apparatus 4 connected to the image processing apparatus 1.

Summary of the Fourth Embodiment

According to the image processing apparatus 1C of the fourth embodiment, a plurality of images can be appropriately selected to generate a high-resolution image.

Other Embodiments

The present invention is not limited to the above embodiments. The present invention can be modified in various ways without departing from the gist thereof.

For example, the functions of the determination unit 15A of the second embodiment and the functions of the determination unit 15B of the third embodiment may be combined. In this case, when there are a plurality of combinations in which the number of comparison images is the maximum number, as in the case of the determination unit 15A, the determination unit first determines a combination in which the corresponding common region is larger from the combinations in which the number of comparison images is the maximum number. When there are a plurality of combinations in which the number of comparison images is the maximum number and the corresponding common region is the maximum number, the determination unit determines a combination having a larger feature amount related to the combination from among the base images in which the number of comparison images is the maximum number and the corresponding common region is the maximum, as in the determination unit 15B. In this manner, the image processing apparatus may weight the number of comparison images, the size of the common region, and the feature amount relating to the combination in this order, and may select the combination so as to maximize the item with the highest weight.

The generation unit 41 according to the fourth embodiment may be provided in the image processing apparatus 1A according to the second embodiment and the image processing apparatus 1B according to the third embodiment.

REFERENCE SIGNS LIST 1, 1A, 1B, 1C . . . image processing apparatus, 11 . . . input unit, 12 . . . acquisition unit, 13 . . . alignment unit, 14 . . . selection unit, 15, 15A, 15B . . . determination unit, 16 . . . output unit, 41 . . . generation unit.

What is claimed is:

1. An image processing apparatus, comprising:
an input unit configured to receive input of a plurality of images;
an alignment unit configured to select each of the plurality of images one by one as a base image, and aligns the base image and each of comparison images, which are images excluding the base image among the plurality of images, for each of the base images based on the image features;
a selection unit configured to select the comparison image to be combined with the base image from among the comparison images aligned with the base image for each of the base images, calculate a common region in which images included in the combination can be commonly drawn, and select the combination in which the ratio of the common region to the base image is equal to or greater than a predetermined threshold;

a determination unit configured to determine the combination that maximizes the number of comparison images from the selected combination; and an output unit configured to output an image group corresponding to the determined combination and information indicating the base image corresponding to the image group.

2. The image processing apparatus according to claim 1, wherein in a case where there are a plurality of combinations in which the number of comparison images is the maximum number, the determination unit determines the combination in which the corresponding common region is larger from the combinations in which the number of comparison images is the maximum number.

3. The image processing apparatus according to claim 1, further comprising an acquisition unit configured to acquire feature amounts from designated regions of each of the plurality of images;

wherein in a case where there are a plurality of combinations in which the number of comparison images is the maximum number, the determination unit determines the combination in which the feature amount related to the combination is larger from the combinations in which the number of comparison images is the maximum number.

4. The image processing apparatus according to claim 3, wherein the feature amount is sharpness.

5. The image processing apparatus according to claim 3, wherein the feature amount is noise.

6. The image processing apparatus according to claim 1, further comprising an acquisition unit configured to acquire feature amounts from designated regions of each of the plurality of images;

wherein in a case where there are a plurality of combinations in which the number of comparison images is the maximum number, the determination unit determines the combination in which the corresponding common region is larger from the combinations in which the number of comparison images is the maximum number;

wherein in a case where there are a plurality of combinations in which the number of comparison images is the maximum number and the corresponding common region is the largest, the determination unit determines the combination in which the feature amount related to the combination is larger from among the combination in which the number of comparison images is maximum number and the corresponding common region is the largest.

7. The image processing apparatus according to claim 6, wherein the feature amount is sharpness.

8. The image processing apparatus according to claim 6, wherein the feature amount is noise.

9. The image processing apparatus according to claim 1, wherein the output unit rearranges and outputs the image group in the order of time series order.

10. The image processing apparatus according to claim 1, further comprising a generation unit configured to generate at least one image using the image group and the information indicating the base image.

11. An image processing method, comprising:

receiving input of a plurality of images;

selecting each of the plurality of images one by one as a base image, and aligning the base image and each of comparison images, which are images excluding the base image among the plurality of images, for each of the base images based on the image features;

selecting the comparison image to be combined with the base image from among the comparison images aligned with the base image for each of the base images, calculate a common region in which images included in the combination can be commonly drawn, and select the combination in which the ratio of the common region to the base image is equal to or greater than a predetermined threshold;

determining the combination that maximizes the number of comparison images from the selected combination; and outputting an image group corresponding to the determined combination and information indicating the base image corresponding to the image group.

12. A non-transitory computer-readable storage media stored an image processing program causing a computer to function as an image processing apparatus, the image processing apparatus comprising:

an input unit configured to receive input of a plurality of images;

an alignment unit configured to select each of the plurality of images one by one as a base image, and aligns the base image and each of comparison images, which are images excluding the base image among the plurality of images, for each of the base images based on the image features;

a selection unit configured to select the comparison image to be combined with the base image from among the comparison images aligned with the base image for each of the base images, calculate a common region in which images included in the combination can be commonly drawn, and select the combination in which the ratio of the common region to the base image is equal to or greater than a predetermined threshold;

a determination unit configured to determine the combination that maximizes the number of comparison images from the selected combination; and an output unit configured to output an image group corresponding to the determined combination and information indicating the base image corresponding to the image group.

* * * * *